United States Patent
Hall et al.

(10) Patent No.: US 7,668,204 B2
(45) Date of Patent: Feb. 23, 2010

(54) PORT DRIVEN AUTHENTICATION IN A NETWORK

(75) Inventors: Brendan Hall, Eden Prairie, MN (US); Michael Paulitsch, Columbia Heights, MN (US); Kevin Driscoll, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 890 days.

(21) Appl. No.: 10/993,164

(22) Filed: Nov. 19, 2004

(65) Prior Publication Data

US 2005/0135425 A1 Jun. 23, 2005

Related U.S. Application Data

(60) Provisional application No. 60/560,323, filed on Apr. 6, 2004, provisional application No. 60/523,785, filed on Nov. 19, 2003, provisional application No. 60/523,782, filed on Nov. 19, 2003.

(51) Int. Cl.
H04L 12/26 (2006.01)

(52) U.S. Cl. .................................. 370/474; 370/248

(58) Field of Classification Search .................. 370/321, 370/337, 347, 442, 395.4, 216–228, 241–250, 370/400; 726/2–10, 16–21
See application file for complete search history.

(56) References Cited

U.S. PATENT DOCUMENTS 4,423,506 A * 12/1983 Kawasaki et al. ........... 370/221
4,593,282 A    6/1986 Acampora et al.
4,872,157 A * 10/1989 Hemmady et al. .......... 370/400
4,977,582 A * 12/1990 Nichols et al. .............. 375/371
5,107,492 A    4/1992 Roux et al.
5,343,474 A    8/1994 Driscoll
5,349,578 A    9/1994 Tatsuki et al.
5,506,838 A *  4/1996 Flanagan .................... 370/258
5,928,332 A    7/1999 Pierce
7,043,022 B1 * 5/2006 Blanchard et al. ........... 380/252
7,286,529 B1 * 10/2007 Thomas ...................... 370/389
7,340,214 B1 * 3/2008 Hamberg .................... 455/41.2
2002/0034197 A1 * 3/2002 Tornetta et al. ............. 370/535
2003/0007508 A1 * 1/2003 Sala et al. .................... 370/468
2003/0076853 A1 * 4/2003 Lohman et al. ............. 370/432
2003/0190923 A1 * 10/2003 Janky et al. ................. 455/518
2004/0196842 A1 * 10/2004 Dobbins ..................... 370/389
2004/0202156 A1 * 10/2004 Fonden et al. .............. 370/389
2006/0098736 A1 * 5/2006 Guevorkian et al. ..... 375/240.12
2006/0271709 A1 * 11/2006 Vasko et al. ................ 709/249

FOREIGN PATENT DOCUMENTS

EP        0 383 475 A2    8/1990
EP        0 491 202 A2    6/1992
GB        2 236 606 A     4/1991
GB        2 250 161 A     5/1992
WO        WO 01/13230 A1  2/2001
WO        WO 02/099643 A2 12/2002

* cited by examiner

Primary Examiner—Kwang B Yao
Assistant Examiner—Kenan Cehic
(74) Attorney, Agent, or Firm—Fogg & Powers LLC

(57) ABSTRACT

A method for authenticating a message in a time division multiple access network is provided. The method includes receiving a message from an active relaying component, inspecting a value in the message inserted by the active relaying component, and comparing the value with an expected value based on a transmission schedule.

4 Claims, 3 Drawing Sheets

PORT DRIVEN AUTHENTICATION IN A NETWORK

CROSS REFERENCE TO RELATED APPLICATIONS

This application is related to and claims the benefit of the filing date of the following U.S. Provisional Applications:

Ser. No. 60/560,323, filed on Apr. 6, 2004 and entitled "MESSAGE AUTHENTICATION IN A COMMUNICATION NETWORK" (the '323 Application).

Ser. No. 60/523,785, filed on Nov. 19, 2003 and entitled "PRIORITY BASED ARBITRATION FOR TDMA SCHEDULE ENFORCEMENT IN A DUAL LINK SYSTEM" (the '785 Application).

Ser. No. 60/523,782, filed on Nov. 19, 2003 and entitled "HUB WITH INDEPENDENT TIME SYNCHRONIZATION" (the 782'Application).

These provisional applications are incorporated herein by reference.

This application is also related to the following US non-provisional applications:

Entitled "PRIORITY BASED ARBITRATION FOR TDMA SCHEDULE ENFORCEMENT IN A MULTI-CHANNEL SYSTEM" filed on even date herewith (the '549 Application).

Entitled "ASYNCHRONOUS HUB" filed on even date herewith (the '031 Application).

These non-provisional applications are incorporated herein by reference.

BACKGROUND INFORMATION

Communication networks are used in a variety of applications including telephone and computer systems, weapons systems, navigational systems, and advanced control systems in cars, aircraft and other complex systems. Given the variety of applications, many kinds of communications networks have been developed over the years. One common characteristic of communication networks is the use of a communication medium that interconnects various nodes on the network. Various topologies and protocols have been developed to control communications between the nodes of these networks.

One network architecture is referred to as Time Division Multiple Access (TDMA). In a TDMA network, nodes in the network are assigned time slots for communicating over the network. Many different TDMA protocols have been developed for communication between nodes of a network. For example, these protocols include TTP/C, SAFEbus, FlexRay and other TDMA protocols.

FIG. 1 is a block diagram of a conventional communication network 100. Network 100 includes a plurality of communicating end stations, referred to herein as nodes, (1). The network 100 also includes relaying devices (2), commonly referred to as guardians. Each guardian (2) has a number of ports (5). In this example, network 100 includes two guardians (2). This allows all data from one node (1) to be transmitted to another node over two different channels, e.g., one channel per guardian. Two channels are commonly used in the industry to provide fault tolerance for the network 100. In other embodiments, any appropriate number of guardians (2) may be used.

The network 100 also includes a number of communication links (3). Communication links (3) comprise one or more of wired, e.g., copper cable, twisted pair, coaxial cable, optical fiber; wireless, e.g., radio frequency, infrared; or other appropriate communication medium. The communication links (3) couple each node (1) with each guardian (2). Messages (4) are sent between nodes (1) through the guardians (2).

Collectively, the nodes (1), guardians (2), and communication links (3) comprise a cluster.

One problem with these TDMA based networks is that faulty nodes can masquerade as other nodes. Masquerading nodes can influence local decisions by pretending to be another node and by behaving differently on different communication channels.

Fault-tolerant systems with only two replicated communication channels are vulnerable to masquerading-induced failure. Previous techniques developed to mitigate masquerade failures require additional redundancy (adding more nodes) and global knowledge of the communication schedule embodied and enforced by a central guardian. In some conventional systems, these techniques have been achieved using dedicated special communication links between guardians. Unfortunately, this, in turn, has compromised the underlying requirement of channel independence in the fault tolerant network. Furthermore, the existing techniques developed to date assume that benign failure modes (such as "stuck at" faults in a guardian). There are other simple failure modes that can cause total system failure, such as shorts between a guardian's inputs and outputs that destroys a network's clock synchronization mechanism by eliminating the assumed propagation delay through each guardian. Further, before achieving synchronous operation, authentication assumed by TDMA protocols cannot be counted on due to the possibility of the masquerading-induced failures and hence proper start-up is also an issue.

Therefore, a need exists for an improved technique for containing faults caused by masquerading nodes in a time division multiple access network.

SUMMARY

Embodiments of the present invention overcome problems with masquerading nodes by requiring the guardian to take an affirmative action when passing data between nodes. In one embodiment, the guardian writes a value, e.g., derived from the port number associated with the node sending the data, into a field in the data. In other embodiments, the guardian performs other actions such as inverting the data from the node, pre-pending or post-pending a value derived from the port number, or other appropriate action that allows the receiving node to authenticate the origin of the data.

DETAILED DESCRIPTION

Embodiments of the present invention address problems with masquerading nodes and with faulty guardians having by-passes or short circuits. Embodiments of the present invention overcome these problems by requiring the guardian to perform an active behavior when relaying traffic.

Figure 1:
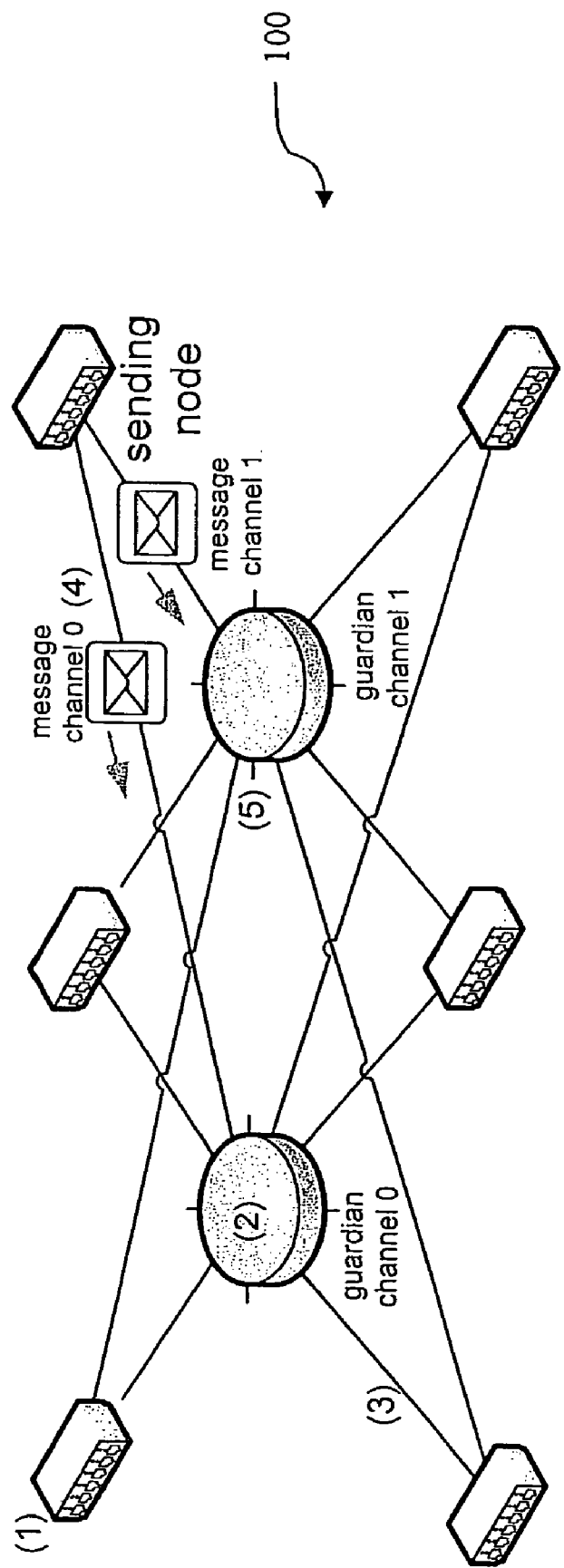
FIG. 1 is a block diagram of a conventional star architecture with dual channels and two guardians.
Figure 2:
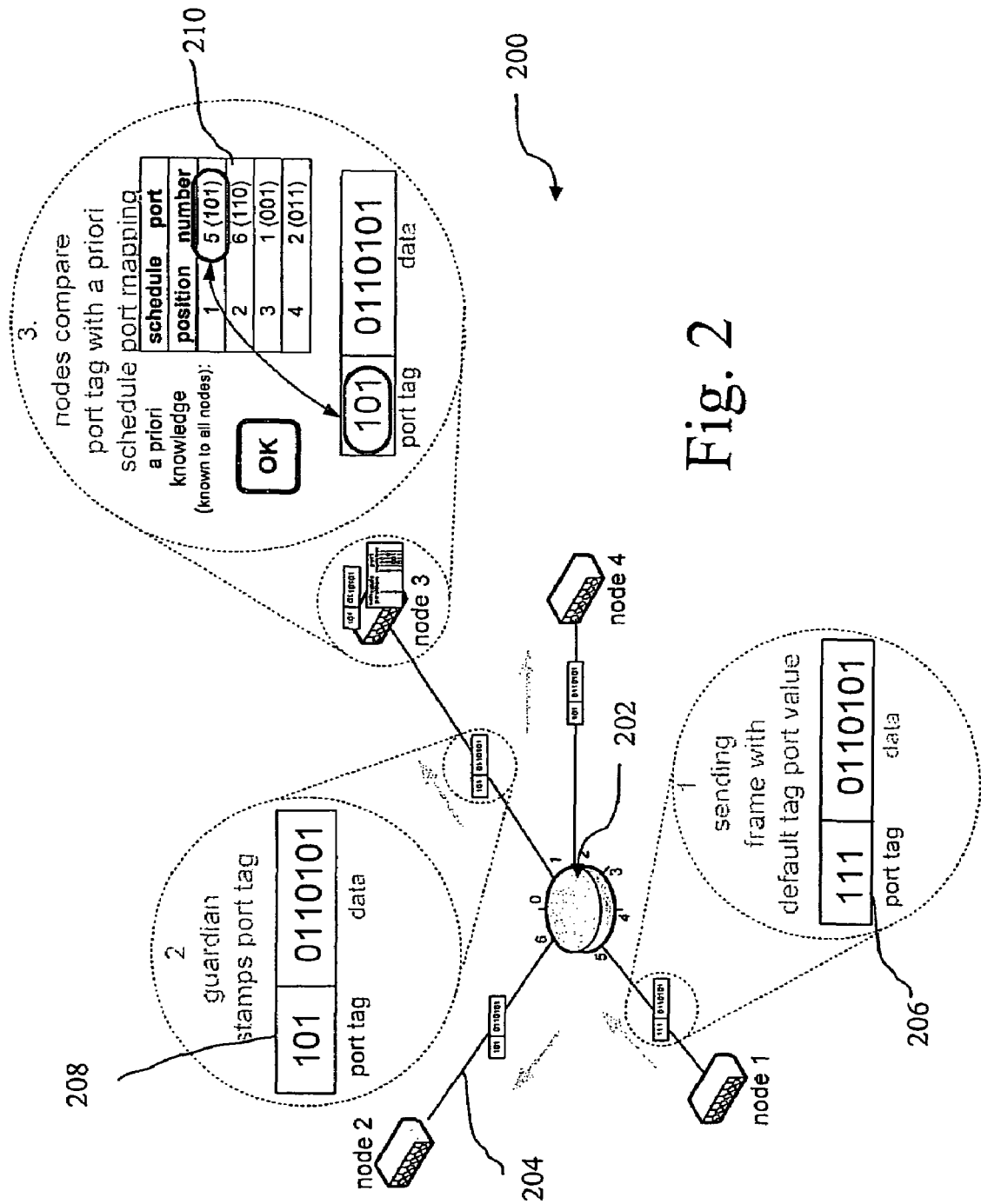
FIG. 2 is a data flow diagram that illustrates one embodiment of the flow of data in a network using independent port-derived authentication.

FIG. 2 is a data flow diagram that illustrates the flow of data in a network 200 using independent port-derived authentication. In this example, network 200 has four nodes identified as Node 1, Node 2, Node 3, and Node 4. Network 200 also includes an active relaying component 202. It is understood that the number of nodes and active relaying components are shown by way of example and not by way of limitation. The techniques described herein are appropriately applied in networks with any appropriate number of nodes and active relaying components. Each node is coupled to active relaying component 202 over a communication medium 204, e.g., one or more of wired, e.g., copper cable, twisted pair, coaxial cable, optical fiber; wireless, e.g., radio frequency, infrared; or other appropriate communication medium.

In operation, network 200 uses port-driven authentication to contain faults in the network. In one embodiment, network 200 uses independent port-derived authentication (IPDA) to contain faults. In one embodiment, the active relaying component 202 writes the port number from which it is relaying the message into the relayed message data stream. In other embodiments, the active relaying component 202 writes a value based on the port number to be written into the relayed message data stream. In other embodiments, other network-wide, unique identifiers are used that identify the source in the network of the message. This active behavior allows detection of fail-passive behavior of the hub and as well as the detection of masquerading nodes by authorizing a message source by an independent device (the active relaying component 202). As this action is based on ports, the active relaying component 202 does not require schedule knowledge.

Advantageously, knowledge of an authorized message can be leveraged in several protocol algorithms deployed in the nodes and can simplify algorithm complexity and replication requirements, while allowing fully independent communication channels and active relaying components, e.g., guardians, and without the active relaying components having knowledge on the TDMA schedule.

To implement this technique, the active relaying component 202 takes a known action on data from the nodes. For example, in one embodiment, the message from a node includes a special field, called the port-tag field. Each node in network 200 is assigned a unique number in network 200. In one embodiment, the unique number is based on the port of the active relaying component 202 to which the node is attached. Further, each node in the network 200 has knowledge of the architectural mapping (that is, which node is attached to which port on active relaying component 202).

The independent port-derived authentication (IPDA) technique implemented in network 200 identifies a relayed frame (assuming a correct sender) as incorrect (by each receiving node) when the action of the active relaying component 202 is missing, e.g., by-passed by a short-circuit between the input and outputs of the active relaying component 202 either internal or external to the active relaying component 202. The IPDA technique assumes that the active relaying component 202 will not perform the required correct action if the active relaying component 202 is faulty. Furthermore, each node authenticates received messages based on knowledge of the other nodes' port numbers and the transmission schedule of the nodes in network 200. Thus, in one embodiment, each node evaluates the port-tag of a received data or message in combination with knowledge of the transmission schedule to verify that the data came from the correct node.

In operation, network 200 implements the IDPA technique to authenticate data relayed by active relaying component 202. Each node includes a reserved field, e.g., the port tag field, within every transmission it makes. In one embodiment, the nodes set the value of this field to a default port tag value (one that is different from any port number present in the system) when transmitting data to the active relaying component 202. For example, as shown in FIG. 2, the port tag field in the message 206 is set to a value of 111. This value is chosen as the default value and is not associated with any port of active relaying component 202.

Active relaying component 202 over-writes the port tag in the frame as the transmission is relayed through it. In one embodiment, the value placed in the reserved field is based on the port from which the active relaying component 202 receives the frame. Continuing with the example in FIG. 2, when Node 1 sends a frame, the active relaying component 202 forwards the frame to all other nodes after inserting the port tag of 101 for port 5 into the frame in the port tag field as indicated at 208 thus indicating that the message originated at Node 1.

Each node receives and authenticates the message from the active relaying component 202. When the frame is received, the node inspects the port tag in port tag field 208. The node compares the received port tag with an expected port tag derived from a known transmission schedule in table 210. Using this information, the node can determine if the frame stems from a correct or a masquerading node, and if the active relaying component is properly performing its tagging function. Again, continuing the example in FIG. 2, node 3 receives the frame from active relaying component 202. Node 3 compares the port tag value of 101 with the value in table 210 stored in Node 3 to determine if the message originated from the correct node and if the active relaying component is functioning properly. Since all information at a receiving node is based an a priori knowledge, active relaying component 202 authorizes the node of origin of a message.

Advantageously, when the active relaying component 202 uses the port number in the active relaying component as a network-wide unique identifier, the complexity of the active relaying component 202 can be minimized as the active relaying component 202 does not require schedule knowledge, if suitable arbitration schemes are deployed as described, for example, in the '785 or '549 Applications.

Figure 3:
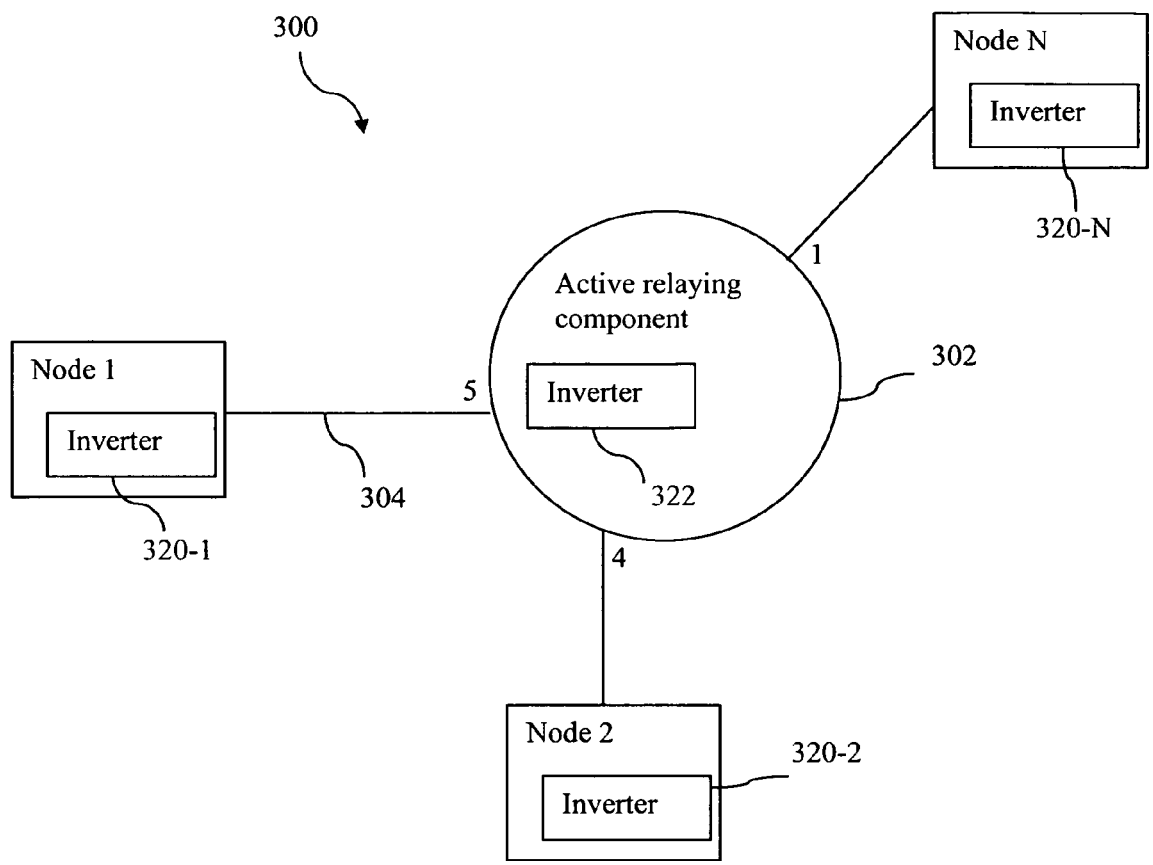
FIG. 3 is a data flow diagram that illustrates another embodiment of the flow of data in a network using independent port-derived authentication.

FIG. 3 is a data flow diagram that illustrates another embodiment of the flow of data in a network 300 using independent port-derived authentication. In this embodiment, the node that originates the message puts the correct port number into the message. The active relaying component 302 checks that the port number in each message matches the port that the message arrived on. This has the benefit that the port number can be included in a message's error detection mechanism (e.g. CRC or checksum). The active relaying component 302 must still do something to the message to allow receiving nodes to detect faults that by-pass active relaying component's checking.

In this embodiment, node 1 through node N each includes a respective one of inverters 320-1 to 320-N. The inverters 320-1 to 320-N invert the message for either transmission or reception, but not both. The active relaying component 302 also includes an inverter 322. The active relaying component also inverts the relayed messages. With no fault, each message is inverted twice, which leaves the message in its initial form. If the active relaying component 302 is by-passed, the message is only singly inverted, which would cause a node's receiver to flag such messages as erroneous. In addition to inverting the message, in one embodiment, the active relaying component 302 also takes some action based on local information to provide the message authentication function. In one embodiment, this action uses the port number as the local information.

In another embodiment of network 200 of FIG. 2, the active relaying component appends a port-derived value, e.g., a port tag, to one end of each relayed message. In one embodiment, the active relaying component pre-pends the value to the leading edge of the message. In another embodiment, the active relaying component post-pends the value to a trailing edge of the message. This has the benefit that any pre-existing transmission mechanism(s) would not have to be changed to add the IPDA technique.

The IPDA technique also could be used in multi-hop networks in which a message is relayed sequentially through 2 or more active relaying components. One method to do that would appear to be the inverse of wormhole routing—each hop through an active relaying component would add another port-tag to the message.

Advantageously, the IPDA technique provides a low-cost communication schemes for networks that need (or assume) authentication. Further, the IPDA technique also may greatly simplify start-up in TDMA schemes when traditional TDMA-based authentication cannot be assumed. The deployment of this IPDA technique may also greatly simplify the design of guardian implementations, as it removes the need of schedule knowledge and associated programming logistics.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions stored on a machine readable medium to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices or machine readable medium suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for authenticating a message in a time division multiple access network, the method comprising:
   receiving a message having a designated field from a node at an active relaying component;
   inserting a unique identifier into the designated field of the message at the active relaying component;
   forwarding the message on to at least one other node in the network;
   authenticating the message at the at least one other node based, at least in part, on the designated field; and
   analyzing the message at the at least one other node to detect passive behavior of the active relaying component;
   wherein the designated field is included in an error detection mechanism of the message received at the active relaying component and authenticating the message comprises calculating, at the at least one other node, an error detection mechanism which includes the designated field; and
   wherein detecting passive behavior comprises detecting one of a short circuit in the active relaying component or a bypass around the active relaying component by absence of a change in the unique identifier.

2. The method of claim 1, wherein inserting the unique identifier comprises inserting a unique identifier based on a port number of the active relaying component.

3. The method of claim 1, wherein receiving a message comprises receiving a message with a default value stored in the designated field of the message into which the active relaying device inserts the unique identifier.

4. The method of claim 3, wherein inserting a unique identifier comprises replacing the default value with a port number of the active relaying component at which the message was received.

* * * * *

UNITED STATES PATENT AND TRADEMARK OFFICE
CERTIFICATE OF CORRECTION

PATENT NO. : 7,668,204 B2  Page 1 of 1
APPLICATION NO. : 10/993164
DATED : February 23, 2010
INVENTOR(S) : Hall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1493 days.

Signed and Sealed this

Seventh Day of December, 2010

David J. Kappos
*Director of the United States Patent and Trademark Office*